United States Patent [19]

Ballard

[11] 4,149,863

[45] Apr. 17, 1979

[54] BAG FILTER APPARATUS

[75] Inventor: Wade E. Ballard, Apple Valley, Calif.

[73] Assignee: Ashland Oil, Inc., Ashland, Ky.

[21] Appl. No.: 830,501

[22] Filed: Sep. 6, 1977

Related U.S. Application Data

[63] Continuation of Ser. No. 700,646, Jun. 28, 1976, abandoned.

[51] Int. Cl.² .............................................. B01D 46/02
[52] U.S. Cl. ........................................ 55/379; 55/302; 55/381; 55/496
[58] Field of Search ................ 55/302, 374, 378, 379, 55/381, 527, 528, DIG. 26, 496

[56] References Cited

U.S. PATENT DOCUMENTS

| | | | |
|---|---|---|---|
| 2,215,282 | 9/1940 | Williams | 55/378 |
| 2,612,236 | 9/1952 | Vedder | 55/378 |
| 3,535,852 | 10/1970 | Hirs | 55/379 |
| 3,538,687 | 11/1970 | Pausch | 55/302 |
| 3,844,750 | 10/1974 | Ray | 55/379 |
| 3,856,489 | 12/1974 | Vokral | 55/379 |
| 3,884,659 | 5/1975 | Ray | 55/379 |
| 3,937,621 | 2/1976 | Gravley | 55/378 |
| 4,056,374 | 11/1977 | Hixenbaugh | 55/378 |

Primary Examiner—Frank W. Lutter
Assistant Examiner—David L. Lacey
Attorney, Agent, or Firm—William Kammerer

[57] ABSTRACT

A fiberglass bag filtering unit adapted for use in filtering gaseous streams containing suspended solid particulates wherein a reverse flow of compressed air is utilized during the cleaning cycle, said unit featuring the advantage of being conveniently adjustable to provide a requisite degree of cloth tension without causing excessive stress conditions to occur at any part of the bag where retained by the support elements of the unit.

9 Claims, 1 Drawing Figure

BAG FILTER APPARATUS

CROSS-REFERENCE TO RELATED APPLICATION

This application is a continuation of application Ser. No. 700,646, filed June 28, 1976, now abandoned.

BACKGROUND OF THE INVENTION

1. Field of the Invention

This invention relates to a flexible bag type filter for cleaning gaseous streams containing suspended solid particulates.

2. Description of the Prior Art

In the carbon black industry, as well as numerous others, there is a need for removing entrained solid particulates from gaseous streams. Carbon black products, for example, are essentially recovered from the aerosol effluent of the furnace by means of bag filters. In this type of filtering operation, the furnace effluent is passed into a battery of suspended bags wherein the carbon black collects upon the interior surface thereof and is periodically removed during the cleaning cycle by contacting the exterior of the bag with a moderately pulsating repressuring gas. Because of the corrosive nature of the carbon black aerosols and the elevated temperature at which they must be filtered, necessitates the use of fiberglass cloth for fabricating the bags. While fiberglass cloth exhibits very low impact strength and abrasion resistance, it nonetheless can be satisfactorily used in the aforesaid primary recovery system since the cloth can cope with the relatively gentle flexing action to which it is subjected in the aforementioned cleaning cycle.

Besides the primary recovery system, filter bags are likewise used in secondary recovery systems in the carbon black industry, that is, in the processing of nuisance streams. Nuisance streams are those arising in the packing of the carbon black and like operations as well as in various drying operations such as encountered in drying pelleted carbon black. Heretofore, synthetic fiber cloth and felt have been almost exclusively used to fabricate bags for secondary filtering operations because of the demands upon the filter medium posed by this type of a system. Such a system differs from a primary recovery one in several important aspects. Firstly, the filter bag is supported by a wire mesh frame and the stream to be cleansed is passed through the bag from the exterior thereof. Secondly, a different method is employed for removing accumulated layers of carbon black during the cleaning cycle. This is achieved in the off-filtering or cleaning cycle by directing blasts of compressed air into the interior of the individual bags.

For reasons which need not be gone into here, the ambient temperature of the aforementioned carbon black nuisance streams has already reached a point where now such streams are having a noticeably deleterious effect on synthetic fiber type of filtering media. This, of course, suggests the use of fiberglass cloth filter bags for ameliorating the situation. But the problem with this approach is premature bag failure insofar as bag life is often measured in hours in the type of filtering operation concerned. It is, accordingly, the object of this invention to provide a fiberglass bag filter construction which can be used in the pulse-jet type of filtering operation whereby the bag life expectancy will exceed that of the synthetic fiber bags employed under the same demanding temperature and corrosive environment.

SUMMARY OF THE INVENTION

In accordance with the present invention a bag filter construction is provided which allows for the extended use of a fiberglass cloth bag in those gaseous stream filtering operations wherein a pulse-jet of air is employed in the cleaning cycle. The bag support assembly of the novel construction comprises an elongated cylindrical wire mesh cage, one end of which is provided with a closure cap and the other end of which fixedly connects to a tubular metal collar having a diameter corresponding to that of the cage. The cage-collar combination serves as the interior supporting structure for a fiberglass tubular sleeve, one end of which is securely fastened to the said cage closure cap. The opposite end of the sleeve is suitably retained in an annular spacing between said collar and a stationary metal thimble encasing the same. Means are provided for positioning the cage-collar support longitudinally relative to the stationary thimble in order to achieve a desired degree of cloth tension and for locking the assembly in such a position.

DESCRIPTION OF THE PREFERRED EMBODIMENT

Figure 1:
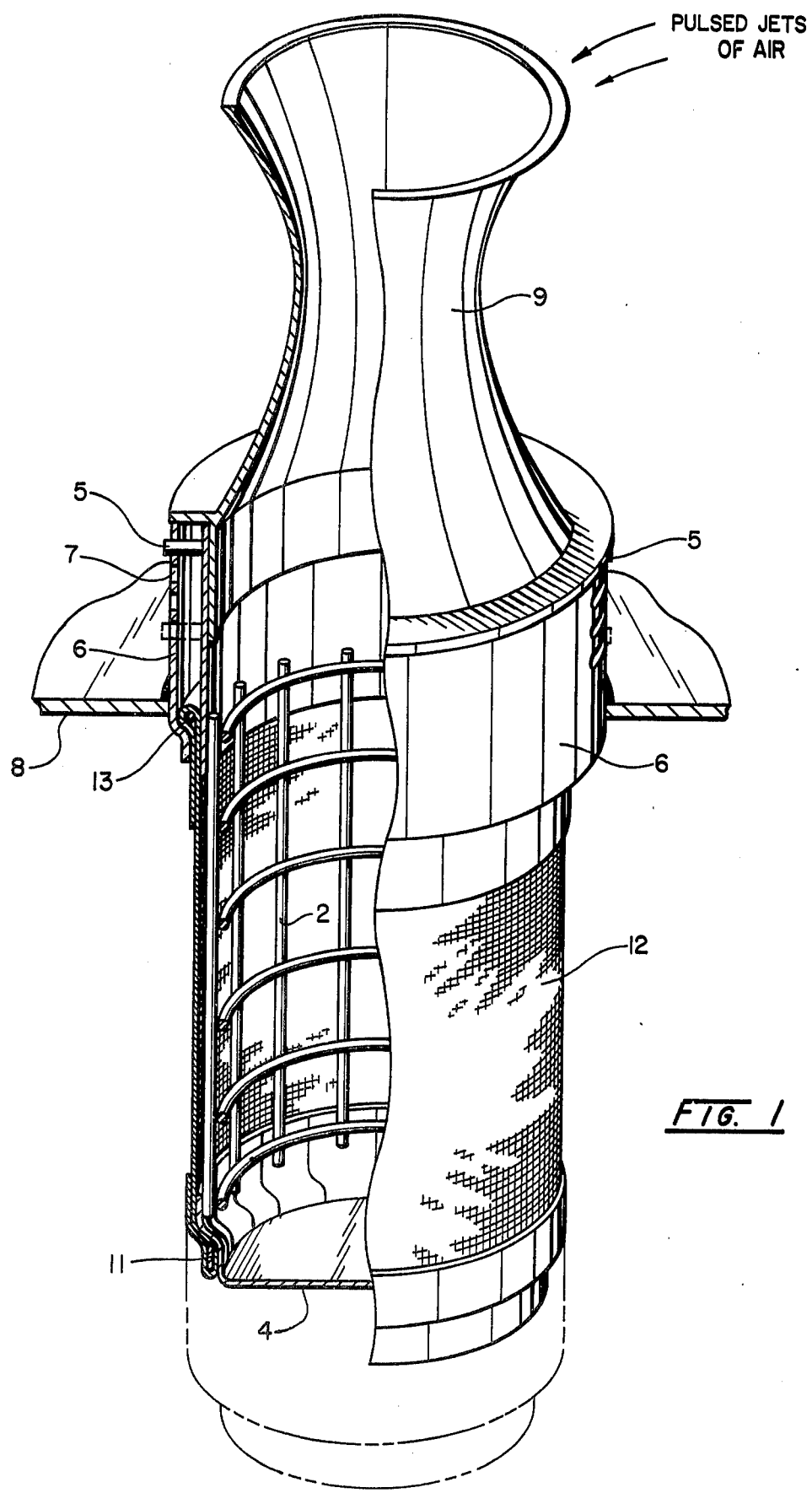
FIG. 1 is an elevational view, partly in section, illustrating the preferred embodiment of this invention.

With reference to the drawing, the metal cage component of the assembly is shown at (2). Because of the corrosive nature of the carbon black streams as indicated, it is desirable to construct the cage, as well as the other component metal parts, of stainless steel. The mesh size can be varied; however, it has been noted that a 1"×1" opening represents about the optimum size. Such a size provides ample support for the bag without excessive reduction of effective filter area. In the type of filter assemblies concerned, bags in the order of 4 or 5" in diameter are customarily preferred. The diameter of the cage will accordingly be marginally smaller than that of the bag. Rigidly attached to the cage (2), as by welding, is a tubular collar (3). The opposite end of the cage is fitted with a metal closure cap (4) which, like collar (3), is rigidly attached to the cage component. Metal cap (4) is constructed so as to provide a narrow rim, offset inwardly with respect to the outside periphery of the cage.

The collar (3) of the collar-cage assembly is provided with two positioned locking pins (5), that are adapted to engage with corresponding lateral slots (7). The lateral slots (7) are interconnected with axially aligned connecting slots so that the locking pins 5 may be moved to engage particular lateral slots. The thimble (6) is welded to a staionary tube sheet, a fragmentary part of which is shown only at (8) in the cut-a-way sectional view portion of FIG. 1. The tube sheet constitutes the bottom wall or floor of the plenum into which the filtered gases are discharged.

A venturi tube section (9) is in open communication with collar (3) and is removably affixed thereto so as to allow for the insertion and removal of the collar-cage assembly from stationary thimble (6) via said axially aligned slot provision. A venturi section as shown is customarily employed in filtering units of this type whereinto a blast(s) of compressed air is directed during the cleaning cycle. While not essential, it is desirable to provide the venturi with a narrow skirt as shown at (10) which insures optimum utilization of the pulse of compressed air. Additionally, a skirt provision serves to position the cage, holding it centered in the thimble and in axial alignment therewith.

The thimble (6) is provided with a lip at about the situs where the tubular collar (3) and cage (2) adjoins. The peripheral edge of said lip is juxtaposed with respect to the collar end joining the cage leaving sufficient spacing to freely accommodate a double thickness of the bag filter cloth.

The filter bag design for use in the instantly described support assembly is such that the end which engages with the exterior face of the cage closure cap offset is provided with a narrow stainless steel band (11) sewed into the cuff. Under tensioning pressure as will be described later this method of securing the bag to the closure cap provides a dust free seal without causing undue stress on the cloth expanse (13) while obviating the need for clamping means or a sewn-in bottom on the bag. The other end of the filter bag is provided with a narrow diameter wire ring (13), typically $\frac{1}{8}$", sewn into the cuff. As shown, the cuff engages with the interior offset or lip of the thimble.

Since the one end of the bag is locked into the thimble, such an arrangment leaves the cage free to move in relation to the stationary thimble so as to apply the desired degree of tension to the cloth. Once the desired tension is applied, the collar is rotated so as to secure pins (5) in a locking position within lateral slots (7).

What is claimed is:

1. In a filtering apparatus of a type wherein at least one filter bag is supported from a filter support wall and positioned and arranged with respect to an opening in said wall to filter solid particulates from gaseous streams and accumulated filtered particles are removed from said at least one filter bag in response to pulsed jets of air, the improvement comprising:

axially extending mesh means for contacting the inside surface of said at least one filter bag to support said at least one filter bag in a particular shape and to allow gas to pass therethrough;

collar means affixed to an end of said mesh means and extending axially from said mesh means to define a bag support surface;

axially extending cap means affixed to the other end of said mesh means for engaging a portion of the bottom end of said at least one bag to close the bottom end of the at least one bag;

thimble means affixed to the outer surface of said filter support wall adjacent an opening in the filter support wall; and locking pin means for detachably engaging said thimble means and said collar means to axially position said collar means with respect to said support wall.

2. The apparatus of claim 1 wherein said mesh means comprises a cylindrical wire mesh cage.

3. The apparatus of claim 2 wherein said wire mesh cage is defined by one inch square mesh openings.

4. The apparatus of claim 1 wherein said at least one filter bag includes a woven sleeve having a band cuffed at the bottom end thereof engaging a recessed rim on a closure face of said cap means to close the bottom end of said bag.

5. The apparatus of claim 4 wherein the material of said woven sleeve is fiber glass.

6. The apparatus of claim 1 wherein said at least one filter bag includes a woven sleeve having a wire ring cuffed at the top end thereof engaging said bag support surface of said collar means and a cooperating lip on said thimble means to hold the top end of the bag in a fixed position.

7. The apparatus of claim 6 wherein the material of said woven sleeve is fiber glass.

8. The apparatus of claim 1 wherein said locking pin means includes at least one locking pin connected to the surface of said collar means and extending outwardly from the axially extending surface of said collar means and at least one slot disposed in said thimble means to define a bag support position.

9. The apparatus of claim 1 including tube means connected to said collar means for directing said pulsed jets of air to said thimble means to blow said accumulated filtered particles from said at least one filter bag.

* * * * *